Figure 1:
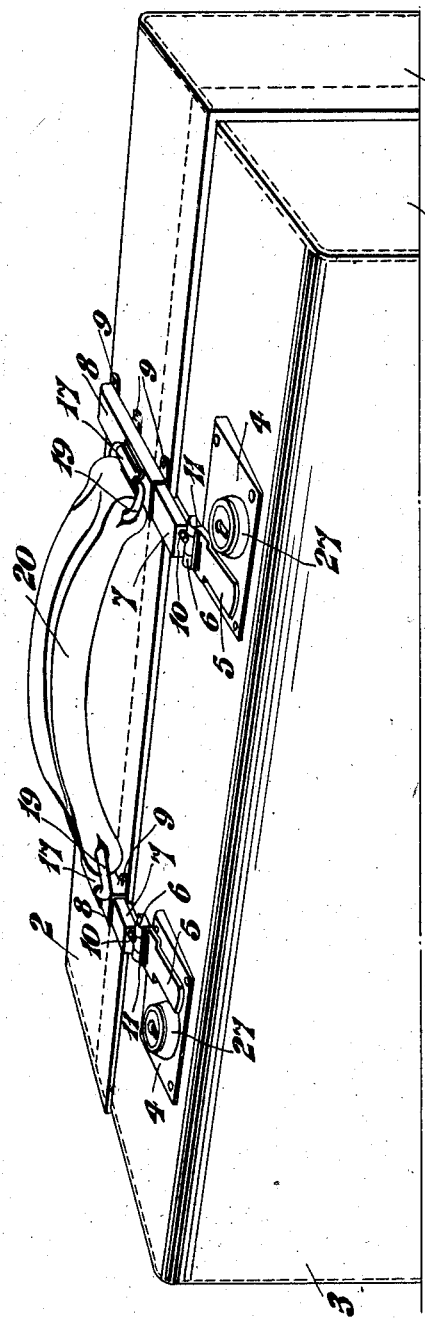

Oct. 18, 1927.

A. B. HAWES ET AL 1,646,092

EXPANDING SUITCASE

Filed March 3, 1927     2 Sheets-Sheet 1

Inventors
Alfred B. Hawes
Robert W. Horton
Frederick C. C. Mayo
by B. Singer Atty Oct. 18, 1927.
A. B. HAWES ET AL
1,646,092
EXPANDING SUITCASE
Filed March 3, 1927    2 Sheets-Sheet 2
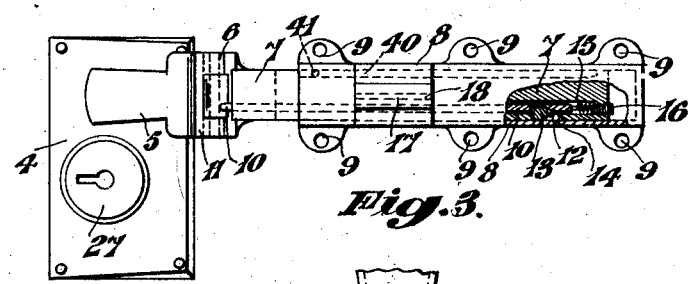
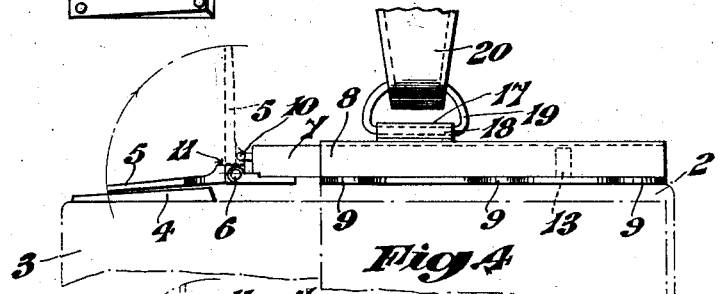
Inventors
Alfred B. Hawes
Robert W. Horton and
Frederick C. C. Mayo
by B. Singer Atty Patented Oct. 18, 1927.

1,646,092

UNITED STATES PATENT OFFICE.

ALFRED BERESFORD HAWES, OF LONDON, ROBERT WILLIAM HORTON, OF EDGWARE, AND FREDERICK CHARLES COOK MAYO, OF HIGH BARNET, ENGLAND.

EXPANDING SUITCASE.

Application filed March 3, 1927, Serial No. 172,519, and in Great Britain February 12, 1926.

This invention relates to expanding suit cases and has reference to the fittings by means of which the expansion and contraction of the case is accommodated.

As is well known expanding suit cases consist of two members fitting one within the other the degree of expansion and contraction being determined by the extent to which the two members are collapsed and in order to permit of any desired size, within the maximum and minimum limits, being attained, the hasp and hinge fittings are constructed of telescoping parts with automatic means for holding the two parts together in the position of desired adjustment. The means hitherto adopted have usually consisted of a detent on one member being adapted to engage the teeth of a rack on the other member, such as has been proposed heretofore to disengage such detent by mechanism operated by turning the hasp of the fastening about its hinge.

It is an object of the present invention to provide fittings in which there will be little or no backlash and which will be capable of easy and instantaneous release when it is desired to adjust the size of the case.

The present invention comprises an expanding suit case of which the two relatively adjustable portions have telescopic hinges and connecting fittings characterized by the telescopic fittings having clutching or fixing devices of such a character that the telescoping members of each fitting will be automatically fixed to each other at any position between their extreme limits when pushed towards each other. Also the telescopic fittings forming the hinge members of such expanding cases may have the outer ends of each pair of telescoping members secured to their respective portions of the case by hinged members.

The clutching or fixing devices of the telescopic fittings may be of the friction grip type arranged to be automatically engaged immediately after the telescoping members have been pushed into one another to any distance within the limit for which the fitting was designed.

In a method of constructing such a telescopic fitting one of the adjacent sliding surfaces of the telescoping members has a transverse recess provided with a freely moving ball or roller adapted when the telescoping members are being drawn apart to be forced into contact with the adjacent surface of the other member by a spring actuated sliding member having an inclined surface adapted to engage the ball or roller, the spring actuated sliding member being provided with a projection extending through the side or end of the outer telescopic member so that it can be pushed out of contact with the ball or roller and so free the telescopic members.

Figure 2:
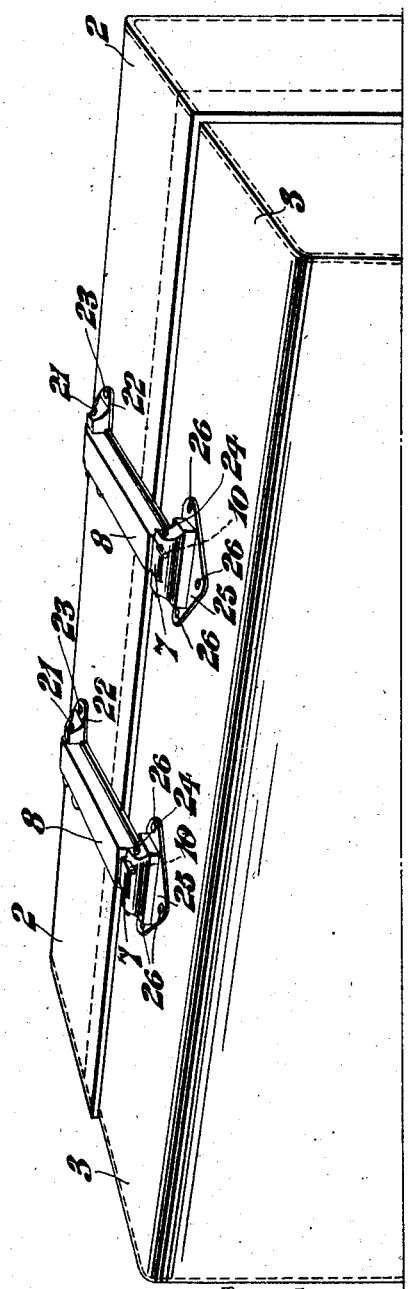

Various embodiments of the invention are illustrated by the accompanying drawings, wherein Figures 1 and 2 are perspective views illustrating the device applied to the hasp and hinge fittings of an expanding suit case, Figure 3 is a plan and Figure 4 an elevation of one form of telescopic hasp fitting, Figure 5 an elevation and Figure 6 a plan of similar views of a telescopic hinge fitting, while Figures 7 and 8 are similar views to Figures 3 and 4 wherein the fitting is released by hand and not by the turning up of the hasp as in Figures 3 and 4.

In these drawings 2 and 3 are the expanding sections or members forming respectively the cover and base of the suit case, 4 the ordinary latch and lock member fixed to the lower or base section 3 of the expanding case, 5 the hasp member engaging the member 4.

The hasp member 5 is hinged at 6 to a sliding member 7 forming one of the pair of telescoping members 7 and 8 of the telescopic fitting. The member 8 in which the other member 7 slides is fixed by rivets 9 to the top or cover member 2 of the case.

Sliding longitudinally in a bore in the sliding member 7 is a rod 10 which projects beyond the end of the member into the path of a tappet projection 11 secured to or forming a part of the hasp 5. The other end of the rod 10 is cut or grooved transversely to form a recess which presents an inclined surface 12 in which recess is located a roller 13 which also extends laterally into a slot 14 cut transversely in and through the sliding member 7. The sliding member 10 is forced towards the hasp 5 by means of a spring 15 which is held in place by an adjusting screw 16. At the top of the member 8 is provided a lug 17 having a hole 18 through which is passed the end wire loop 19 of a handle 20.

The roller 13 and inclined surface 12 operate with respect to the opposing surface of the member 8 which is exposed by the slot 14 as a one way clutch. Thus it enables the sliding member 7 to be pushed in the fixed member 8 but any attempt to pull the sliding member 7 out of the member 8, brings with it the spring pressed rod 10 and allows the spring 15 to force the inclined surface 12 against the roller 13 and so jam it between said surface 12 and the exposed opposing inner surface of the member 8. The jammed roller 13 is released by pushing in the rod 10, and this is effected in the example shown in Figures 1 to 4 by the projection 11 of the hasp member 5 when the latter is turned about its hinge 6 upon detaching it from the lock 4. With the parts in this position the member 7 can telescope freely in the member 8.

The corresponding parts in the sliding hinge fitting shown in Figures 5 and 6 operate in the same manner as described above and are given the same reference numerals. In order to enable the cover 2 of the case to turn freely about its hinges whatever the relative positions of the expandible sections 2 and 3 of the case, the member 8 is not connected directly to the case but is free to move about a hinge pin 21 by which it is connected to a hinge member 22 which is secured to the cover 2 of the case by rivets 23. The sliding member 7 in a similar manner is movable about a hinge pin 24 by which it is connected to a hinge member 25 which is secured to the base portion 3 of the case by rivets 26. The member 11 in this case takes the form of a projection extending from the base of the hinge member 25 into the path of the projecting end of the rod 10 and which is operated in a similar manner to that described with reference to the hasp 5.

In using a case provided with fittings described with reference to Figures 1 to 6 assuming the case to be collapsed and the lid closed. When it is desired to use the case each hasp 5 is released in the usual manner by pressing laterally a lock slide 27, the upward movement of the hasp 5 brings the projection 11 into contact with the projecting end of the rod 10 and so releases the clutch action of the roller 13. When the released cover or lid is turned about its hinge pin 24 a similar action takes place with the corresponding projection 11 and rod 10 of the hinge fitting so that the members 7 and 8 of the hinge fitting are free to be moved away from one another, and this is effected in respect of both the hinge fittings by pulling the cover 2 of the case away from the base member 3. After the case has been filled to the desired extent, the lid is turned into position about its hinge pins 24 and 21 and the member 7 of the hasp 5 pulled outwards and the hasp 5 turned about its hinge into engagement with the lock member 4 in the usual manner, the cover member 2 is then pressed towards the base member 3 by an amount corresponding to the contents of the case when the clutch rollers 13 immediately come into operation and prevent the two parts of the case being separated until the hasps 5 are again released.

In the modification of the hasp member illustrated by Figures 7 and 8, instead of providing a projecting end of the rod 10 to be engaged by the hasp 5 the rod 10 is operated positively by means of a button 30 connected by a rod 31 passing through a slot in the member 7 and connected directly to the rod 10, the spring 15 being arranged to push the roller 13 normally up the inclines 32 provided on the member 7 and into engagement with the inner surface of the member 8 the spring pressure on the roller 13 being released when desired by compressing it by means of the sliding button 30 such sliding motion also causing the recess 33 in the end of the rod 10 to engage the roller 13 and pull it down the inclines 32 of the member 7 into unclutched position.

In order to prevent the member 7 being pulled entirely out of the member 8, the latter on its under side is provided with a longitudinal slot 40 in which projects a pin 41 secured to the adjacent side of the member 7. This construction may be substituted by any other suitable device.

The clutch devices are shown on one side of the rods 7 only, they may however be provided on opposite sides.

By providing telescopic hinge fittings of the particular construction described, that is with hinge members at opposite ends of the pair of telescoping members the case can be readily opened about its hinges even when collapsed to its minimum size and at the same time maintain the rectangular character of the case. By this means when the case is opened about the hinge fitting in the usual way the hinge fitting will automatically accommodate itself to the changing positions and the case will open without straining or any tendency of the one part of the case to bind upon the other part.

The invention having been particularly described with reference to suit cases, it will however be obvious that it is applicable to other collapsible cases of similar shape.

What we claim and desire to secure by Letters Patent is:—

1. An expanding suit case comprising two relatively adjustable portions, one provided with a lock, and connecting means for said portions, said connecting means including a pair of telescopically related members, one of said members being attached to one portion of the suit case and the other member having a hasp attached thereto to cooperate with said lock, and means to functionally secure said members together in any adjustment of the same, said securing means comprising a rolling member movable with one of said telescopically related members and in contact with the other, and an operating rod movable and mounted in the other telescopically related member and having a camming surface presented to said rolling member.

2. An expanding suit case comprising two relatively adjustable portions, one provided with a lock, and connecting means for said portions, said connecting means including a pair of telescopically related members, one of said members being attached to one portion of the suit case and the other member having a hasp attached thereto to cooperate with said lock, and means to functionally secure said members together in any adjustment of the same, said securing means comprising a rolling member movable with one of said telescopically related members and in contact with the other, and an operating rod movable and mounted in the other telescopically related member and having a camming surface presented to said rolling member and a spring to impart movement to said rod in the direction required to cramp said rolling member, the said rod being arranged for movement by the hasp to release said rolling member when said hasp is opened from the lock.

3. An expanding suit case comprising two relatively adjustable portions, and telescopically related connecting means for said portions each having one member associated with one portion of the case and a second member fixed to the other portion of the case and in which the first named member is slidable, a rolling clutch member running freely in a transverse opening with which the first named telescoping member is provided, a rod sliding longitudinally in said first member and provided with a transverse recess having an inclined camming side presented to said rolling member, and also provided with a spring for moving said rod longitudinally in one direction, means for pushing the rod against its spring to free the said rolling clutch member, the rolling clutch member being arranged to extend into the transverse recess in the rod and be pushed when operated by the spring by the incline of the recess in the rod into gripping contact with the second of the telescopic members.

4. An expanding suit case comprising two relatively adjustable portions and telescopically related connecting means for said portions, each having one member associated with one portion of the case and a second member fixed to the other portion of the case and in which the first named member is slidable, a rolling clutch member running freely in a transverse opening with which the first named telescoping member is provided, a rod sliding longitudinally in said first named member and provided with a transverse recess having an inclined camming side presented to said rolling member and also provided with a spring for moving said rod longitudinally in one direction, a pivoted lever adapted to push the rod against the spring and thereby free the rolling clutch member, said clutch member being arranged to extend into the transverse recess in the rod and to be pushed when operated by the spring by the inclined side of the recess in the rod into gripping contact with the second named telescopic member, said pivoted lever being pivoted to the member which slides in the second named telescopic member.

5. An expanding suit case comprising two relatively adjustable portions and telescopically related connecting means for said portions each having one member hinged to one portion of the case and a second member hinged to the other portion of the case and in which the first named member is slidable, a rolling clutch member running freely in a transverse opening with which the first named telescoping member is provided, a rod sliding longitudinally in said first named member and provided with a transverse recess having an inclined camming side presented to said rolling member and also provided with a spring for moving said rod longitudinally in one direction, a pivoted lever adapted to push said rod against its spring and thereby free said rolling clutch member, said rolling clutch member being arranged to extend into a transverse recess in the rod and to be pushed when operated by the spring by the inclined surface of the recess in the rod into gripping contact with the second named telescopic member, said pivoted lever being pivoted to the member which slides in the second named telescopic member.

In witness whereof we affix our signatures.

ALFRED BERESFORD HAWES.
ROBERT WILLIAM HORTON.
FREDERICK CHARLES COOK MAYO.